Mar. 20, 1923.  1,449,066.
H. J. SMITH.
MOTOR OILER.
FILED MAR. 15, 1921.
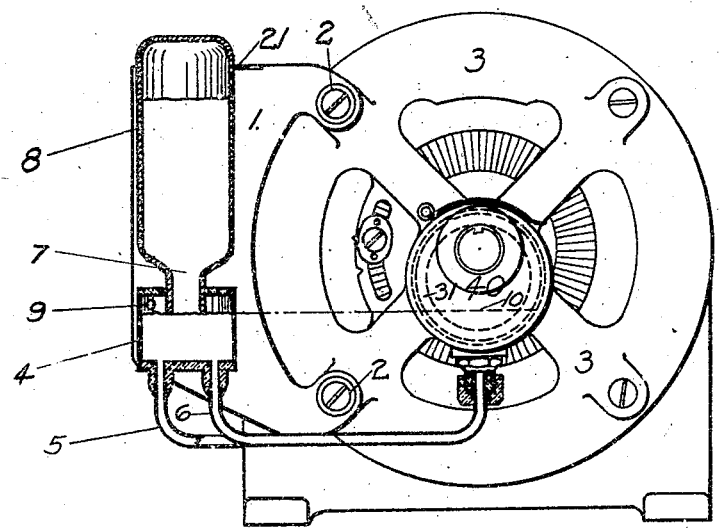
Fig. I.
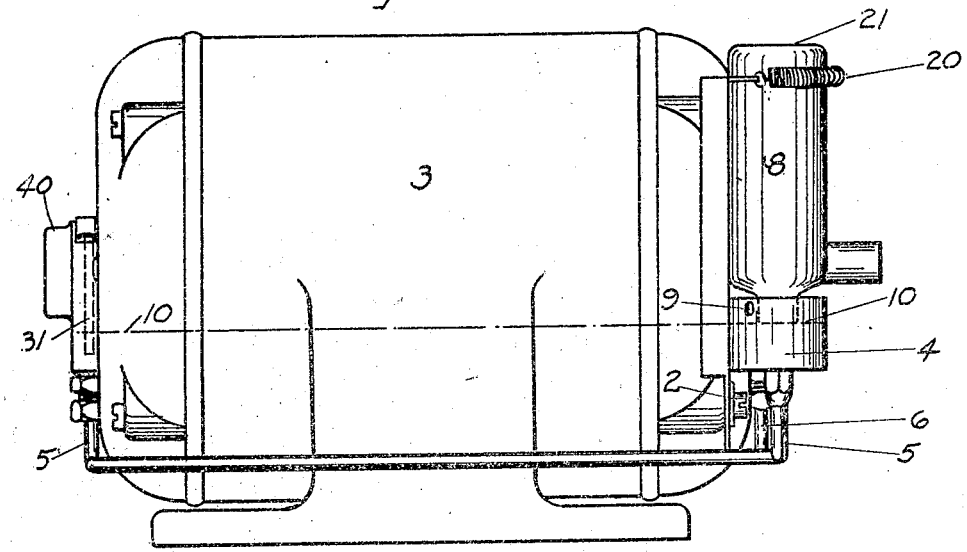
Fig. II.
HAZOR JUDSON SMITH
INVENTOR
BY *Edw. Paulinsky*
ATTORNEY Patented Mar. 20, 1923.

1,449,066

UNITED STATES PATENT OFFICE.

HAZOR JUDSON SMITH, OF CHICAGO, ILLINOIS, ASSIGNOR, BY DIRECT AND MESNE ASSIGNMENTS, OF ONE-FOURTH TO WILLARD REED AND ONE-HALF TO ALFRED HASTINGS CHAPIN, BOTH OF SPRINGFIELD, MASSACHUSETTS.

MOTOR OILER.

Application filed March 15, 1921. Serial No. 452,497.

*To all whom it may concern:*

Be it known that I, HAZOR JUDSON SMITH, a citizen of the United States, residing in Chicago, Cook County, State of Illinois, have invented certain new and useful Improvements in Motor Oilers, of which the following is a specification, reference being made to the accompanying drawings, forming part thereof.

This invention relates to oilers for bearings and especially to oilers for motor bearings of the slip ring type and has for its object to provide a simple, cheap and compact oiler that will maintain a constant level of oil in the bearing thereby preventing the bearing to run dry due to long use.

All motors with the exception of the smaller sizes are provided with ring oilers, in which a metal ring runs on a revolving shaft and hangs down into the oil supply, carrying oil up onto the shaft as it runs. The bearing runs dry very soon and this necessitates frequent inspections or the bearing will burn out.

The object of this invention is to provide a device that will keep the oil at a constant level, supplying oil to the bearing as it is consumed.

The foregoing and other features of my invention will now be described in connection with the accompanying drawing forming part of the specification, in which I have represented my motor oiler embodying the improvements in the preferred form, after which I shall point out in the claim those features which I believe to be new and of my invention.

Having thus set forth my invention I will now describe an embodiment thereof:

In the drawings:—

Figure I is an elevation of my device in part section attached to a motor bearing.

Figure II is an elevation at right angles to that shown in Figure I.

In the carrying out of my invention I provide a support plate 1 which may be of any design, but is shown carried on the bearing plate studs 2 of the motor 3. Attached to the plate 1 is the oil reservoir 4 from which the oil ducts 5 and 6 lead to the bottom of the oil chambers of the motor 3 itself. The oil reservoir 4 has an opening 7 in its top plate through which is inserted the neck of the oil container or bottle 8. A breather hole 9 is provided in the wall of the reservoir 4 above the line 10 which is the top of the oil. This breather hole permits the free passage of air to or from the top of the reservoir 4. The spring 20 holds the bottle 8 securely in position in the segmental recess of the lip 21 of the plate 1, but may be lifted over the top of the bottle thus freeing it for refilling.

In use the level of the oil is maintained by gravity flow from the reservoir 4 through the ducts to the bearing oil chambers. The level must be high enough to contact with the bearing oiling ring 31, or preferably high enough to submerge the lower side of the ring 31 about as indicated.

The bottle 8, having but the one opening, is filled with oil and inverted, the neck inserted into the hole 7 in the top of the reservoir 4. Oil will flow from the bottle until the level in the bearings 40 and the reservoir 4 has reached the level 10 which is the point at which the oil prevents more air from entering the bottle and therefore atmospheric pressure will retain the balance of the oil within the bottle. As the oil is used by the motor the level 10 will fall enough to permit air to enter the neck of the bottle and enough oil will flow down into the reservoir 4 to reestablish the level of oil. Thus we have a constant level of oil at the bearings 40 without any danger of flooding the bearing and with sufficient capacity to run a long time. The bottle which may be transparent allows for easy inspection of the oil reserve without removing the bottle or container. It also removes the probability of permitting the motor to run dry.

The motor oiler illustrated and described is in the form in which I desire to construct it, but any changes or modifications may be made without departing from the salient features of my invention, and I therefore intend the following claim to cover such modifications as naturally fall within the line of invention.

Having thus fully described my invention what I claim as new is:

In combination, a motor having bearings at front and rear thereof, an oil chamber associated with each bearing, an oil reservoir in proximity to one bearing having an apertured top portion, oil ducts connecting the oil chamber of each bearing with said reservoir, an inverted frangible receptacle serving as an oil supply supported upon said reservoir, said receptacle having a reduced neck portion having parallel walls, said neck portion frictionally engaging the apertured top of the reservoir, resilient means to prevent accidental displacement of said receptacle, and an air vent below the plane of the top of the reservoir, and an oil ring in each oil chamber engaging a motor bearing, whereby a constant level of oil is maintained in the reservoir below the air vent, the oil communicating with each bearing at a point entirely below the bearing, the oil ring conducting the oil to the bearing.

In testimony whereof I have signed my name to this specification in the presence of two witnesses.

HAZOR JUDSON SMITH.

Witnesses:
 WILLARD REID,
 G. A. PENNER.